United States Patent [19]

Gläser et al.

[11] Patent Number: 5,494,632
[45] Date of Patent: Feb. 27, 1996

[54] METHOD FOR APPLYING AFTERPRESSURE ON INJECTION MOLDING COMPOUNDS

[75] Inventors: Arnaldo Gläser, Neunkirchen; Dieter Schimmel, Roth, both of Germany

[73] Assignee: Mannesmann Aktiengesellschaft, Dusseldorf, Germany

[21] Appl. No.: 456,288

[22] Filed: May 31, 1995

Related U.S. Application Data

[63] Continuation-in-part of Ser. No. 93,356, Jul. 16, 1993, abandoned.

[30] Foreign Application Priority Data

Jul. 17, 1992 [DE] Germany ............... 42 24 196.0

[51] Int. Cl.⁶ ................................................ B29C 45/57
[52] U.S. Cl. ................... 264/328.8; 264/328.19; 425/146; 425/557; 425/562
[58] Field of Search ..................... 264/40.1, 328.8, 264/328.13, 328.14, 328.19; 425/145, 146, 557, 560, 561, 562, 563

[56] References Cited

U.S. PATENT DOCUMENTS

| | | | |
|---|---|---|---|
| 4,695,238 | 9/1987 | Taniguchi | 425/557 |
| 5,135,701 | 8/1992 | Farrell | 425/558 |
| 5,219,512 | 6/1993 | Tsutsumi | 425/562 |

Primary Examiner—Jill L. Heitbrink
Attorney, Agent, or Firm—Cohen, Pontani, Lieberman, Pavane

[57] ABSTRACT

A method and an apparatus for applying afterpressure on injection molding compounds, particularly PET compounds in an injection molding machine including an injection mold and a screw connected to the injection mold through supply ducts. The injection molding material is conducted to the mold cavity by the screw in order to fill the injection mold. After the filling procedure has been concluded, the material flow is cutoff in the vicinity of the screw opening. During the phase of material shrinkage, the loss of volume is compensated by additionally conveying material present in the supply duct between the screw and the mold cavity. After cooling of the injection molding material, the continuous material flow of injection molding material into the mold cavity is separated from the material flow in the supply duct. After adjusting the pressure of the material in the supply duct to the pressure of the material in the screw, the separation from the screw is again opened and the material flow to the supply duct is released in order to once again form a continuous material flow. The material flow to the supply duct is again released without interruption of the material strand for an unimpaired injection procedure.

3 Claims, 4 Drawing Sheets

METHOD FOR APPLYING AFTERPRESSURE ON INJECTION MOLDING COMPOUNDS

This is a continuation-in-part, of application Ser. No. 08/093,356, filed Jul. 16, 1993 now abandoned.

BACKGROUND OF THE INVENTION

1. Field of the Invention

The present invention relates to a method for applying afterpressure on injection molding compounds, particularly PET compounds, in an injection molding machine including an injection mold and a screw connected to the injection mold through supply ducts. The present invention further relates to an apparatus for carrying out the method.

2. Description of the Related Art

After an injection mold has been filled with thermoplastic material, cooling of the material results in contraction or shrinkage of the molded article. This leads to non-uniform wall thicknesses and changes in the material structure because of the different temperatures in the molded article. For reducing the effects of the shrinkage of the volume, additional plastics material is conveyed into the injection mold and an afterpressure is simultaneously exerted on the material.

DE-OS 33 07 586 discloses a method of producing molded articles by injection molding, in which the material used for injection molding is collected in a storage unit arranged in the vicinity of the cylinder, the connection between the screw and the mold cavity is interrupted and afterpressure is applied to the stored material by means of a separate drive.

The disadvantage of this arrangement for injection molding articles of plastics material is the fact that the flow of material is separated from the principal supply flow and the material collected in the storage unit is conveyed subsequently. Storing a plastics material compound in a separate storage space has the following disadvantage: the material stored in the storage space will have different properties than the principal material during the various injection molding cycles. Since the material in the storage unit is not completely exchanged during each injection procedure, the stagnating material may be subjected to a thermal decomposition of the molecular structure.

DE-OS 35 16 179 discloses a method and an apparatus for the production of articles of thermoplastic materials by means of injection molding, in which a second storage space is provided between the screw and the injection mold, wherein the second storage space can be closed by a locking element and wherein an annular piston is provided for the second storage space which makes it possible to press additional thermoplastic material into the mold cavity by moving the entire screw unit.

This arrangement has the disadvantage that it is necessary to move the entire screw. In addition, the movement of such large units makes precise metering almost impossible.

SUMMARY OF THE INVENTION

Therefore, it is the primary object of the present invention to provide a method of the above-described type and an apparatus for carrying out the method, in which the above-mentioned disadvantages are avoided and a sensitive pressing of additional homogenous injection molding material into an injection mold is ensured with simple means.

In accordance with the present invention, the method for applying afterpressure to the injection molding compound includes the following steps:

(a) The injection molding material is conducted to the mold cavity by means of the screw for filling the injection mold.

(b) At the end of the filling procedure, the material flow is cutoff in the vicinity of the screw opening.

(c) During the phase of material shrinkage, the loss of volume is compensated by additionally conveying the material present in the supply duct between the screw and the mold cavity.

(d) After the conclusion of the cooling phase of the injection molding material, the continuous material flow of plastics material in the mold cavity is separated from the material flow in the supply duct.

(e) After the pressure of the material in the supply duct has been adjusted to the pressure of the material in the screw, the separation from the screw is again opened and the material flow to the supply duct is released in order to once again form a continuous material flow.

(f) The material flow to the supply duct is again released without interruption of the material strand for an unimpaired injection procedure.

The apparatus according to the present invention includes an afterpressure component with a supply duct for connecting the screw to the injection mold part with the mold cavity. A first duct portion in communication with the screw leads into a second duct portion extending perpendicularly to the first duct portion. A slide unit is provided in the second duct portion. The slide unit is composed of two components which are slidable independently of each other in the second duct portion. The two components are a piston and a sleeve surrounding the piston.

Thus, in accordance with the present invention, the injection molding compound is conveyed from the screw to the mold cavity through a supply duct which does not have any dead spaces. The supply duct is configured in such a way that the material flow can be blocked and moved in a sensitive manner by means of a slide unit which is structurally simple and small in relation to the overall dimensions.

Since the slide unit is composed of two components, the continuous material flow can be cutoff precisely by means of the second component of the slide unit which may be knife-shaped or sleeve-shaped. When the piston-shaped first component presses the material, the knife-shaped component is used for blocking the plastics material flow from the screw. After the slide component used for blocking has been opened, all material present in the apparatus is further conveyed without resulting in stagnating material. Only original material is supplied to the mold cavity.

The slide unit has drive units which can be independently actuated for the two components of the slide unit. This makes possible an extremely sensitive control of the additional quantity of material filled into the mold cavity and of the pressure used for pressing in the material.

The supply duct is formed in an afterpressure component which can be easily mounted between the screw nozzle and the injection mold. The supply duct is constructed in such a way that the injection molding material can flow therethrough without significant impairment. The afterpressure component is heated and equipped with a temperature control. Because of the short flow distance, there is little thermal influence on the melt.

The afterpressure component is connected on the side of the molding tool to a hot duct distributor.

As a result, it is possible, in addition to influencing the pressure and volume, to influence the temperature of the injection molding material.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described a preferred embodiment of the invention.

DETAILED DESCRIPTION OF THE PREFERRED EMBODIMENTS

Figure 1:
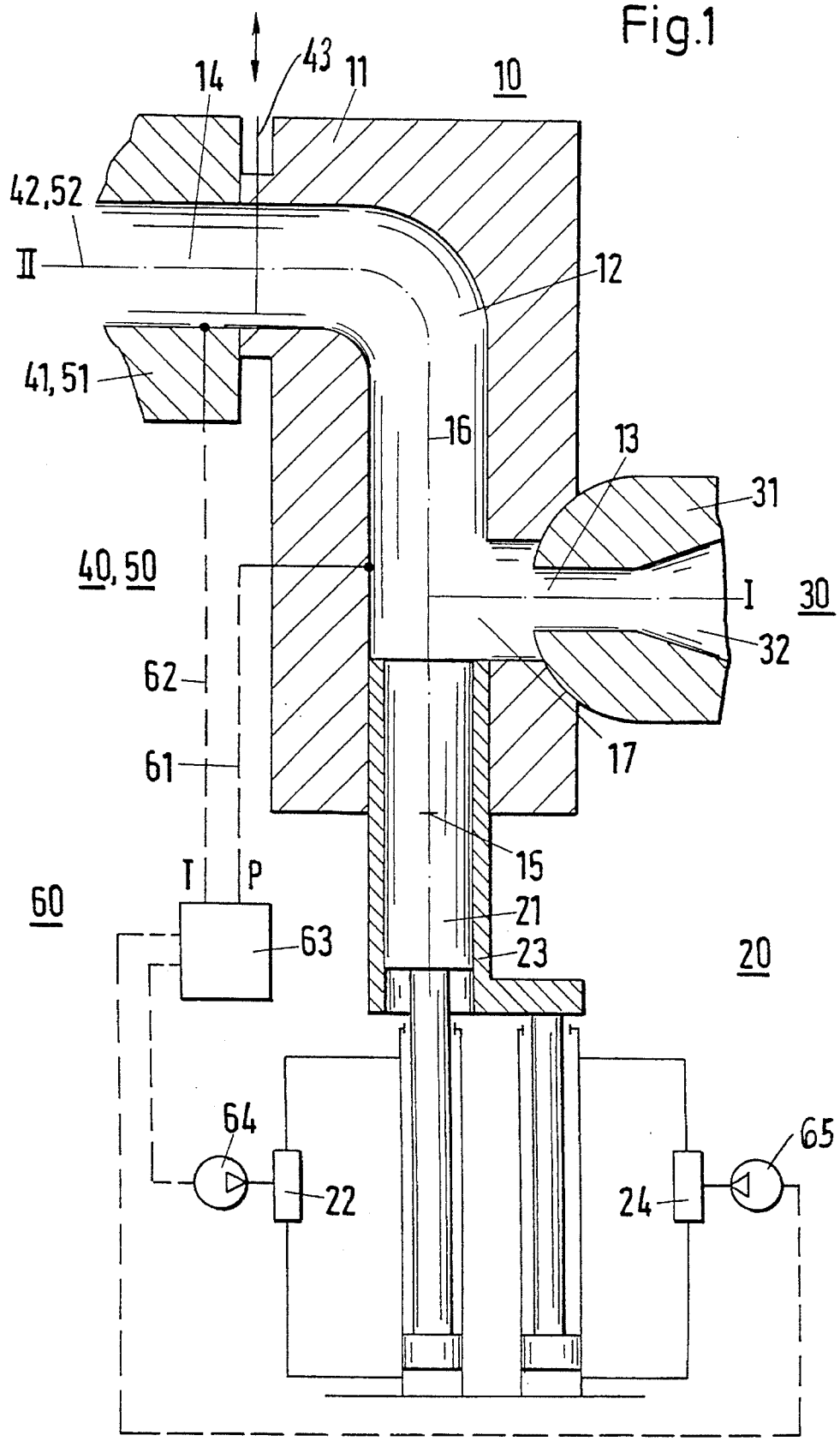
FIG. 1 is a schematic sectional view of the apparatus according to the present invention.

FIGS. 1–4 of the drawing each show an afterpressure component 10 with a housing 11 which defines a supply duct 12. The component 10 has three openings 13, 14 and 15. A screw 30 is arranged at the opening 13 and a mold part 40, or possibly a hot duct unit 50, is arranged at the opening 14. A slide unit 20 is provided at the opening 15. The supply duct 12 includes a screw supply duct 17 including the opening 13 and extending coaxially to the principal axis of the screw. A duct portion 16 extends perpendicularly to the screw supply duct 17 and coaxially with the axis of movement of the slide unit 21. In the illustrated embodiment, the duct portion 16 includes a bend of 90°, so that a part of the duct portion 16 has a center axis II which extends parallel to the principal axis I of the screw.

The slide unit 20 includes a piston 21 which can be actuated by a piston drive 22.

In the illustrated embodiment, the slide unit 20 further includes a sleeve 23 for blocking the duct portion 17. The sleeve 23 coaxially surrounds the piston 21 and can be moved by a sleeve drive 24.

A nozzle 31 with a duct 32 are provided for the screw 30 which is not illustrated in detail.

Of the mold part 40 which is also not illustrated in detail, the drawing schematically shows only a portion of a housing 41 with a duct 42 and a mechanism 43 for separating the continuous flow of plastic in the mold cavity from the material flow in the supply duct 12. The separating mechanism 43 is only shown schematically since those skilled in the art would readily understand how to construct and provide such a mechanism without undue experimentation or a hot duct unit 50 with a housing 51 which includes a duct 52. A measuring and regulating unit 60 can be connected to the afterpressure component and to the slide unit. In the illustrated embodiment, the measuring and regulating unit 60 includes a measuring sensor 61 for pressure and a measuring sensor 62 for temperature. The unit 60 controls the piston 21 and the sleeve 23 through a control unit 63 which acts on pumps 64 and 65, respectively. The control unit 62 is used to adjust, i.e., increase, the injection molding compound pressure in the supply duct to be the same as the molding compound pressure in the screw. The pressure sensor 61 measures pressure in the supply duct, which measurement is used to control the piston 21 and the sleeve 23. The piston 21 presses the compound in the supply duct 12 to achieve the desired pressure, and then maintains this pressure.

FIG. 1 shows the slide unit 20 in the open position, i.e., the piston 21 is in its initial position and is located on the same level as the sleeve 23, such that the end faces of the piston 21 and of the sleeve 23 form part of the wall of the screw supply duct 17.

Figure 2:
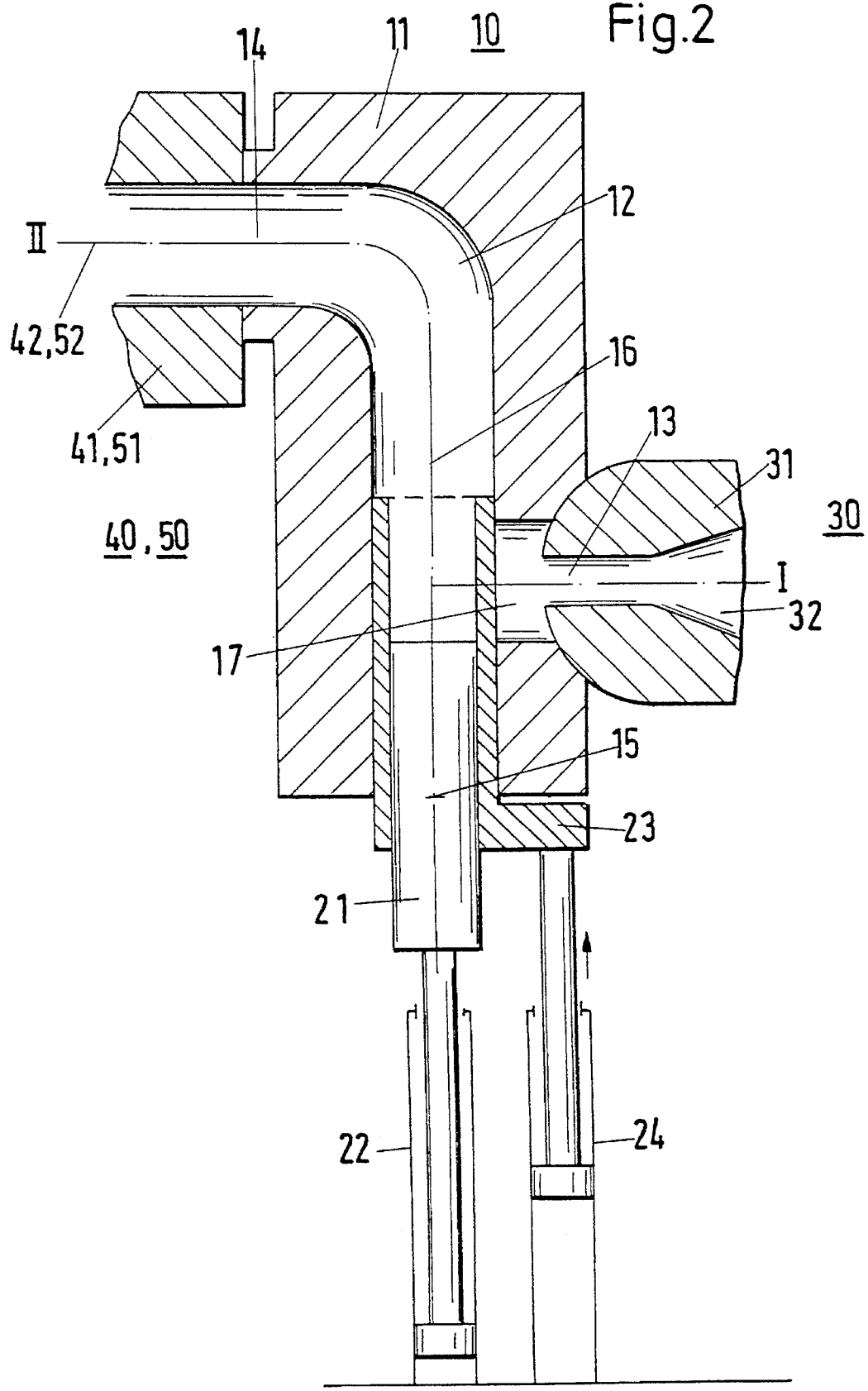
FIG. 2 shows the apparatus of FIG. 1 during the phase of blocking the duct from the screw.

After the injection molding compound has been conveyed by means of the screw 30, the supply duct 17 is closed by means of the sleeve 23, as shown in FIG. 2, and the flow of material is interrupted.

Figure 3:
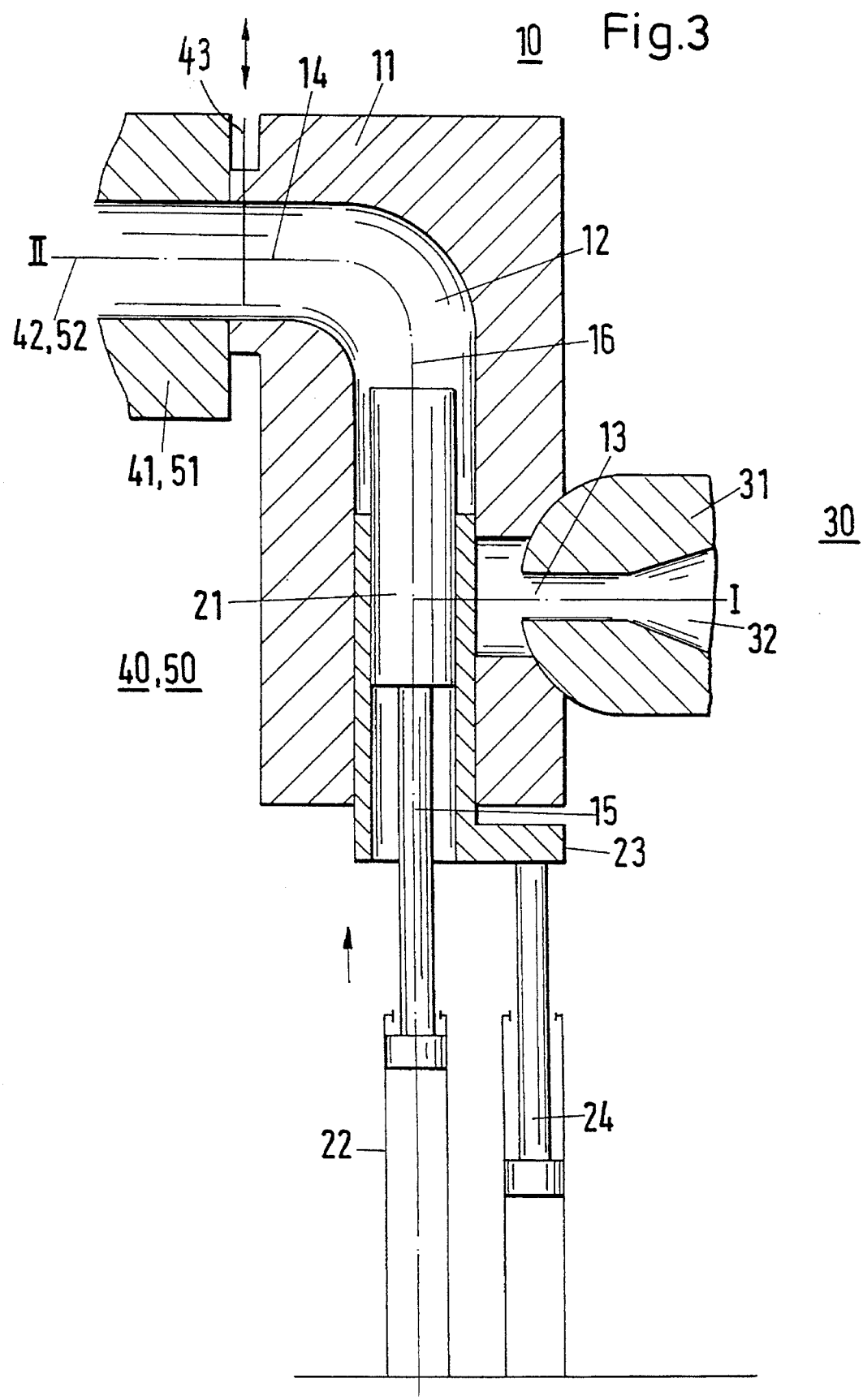
FIG. 3 shows the apparatus of FIG. 1 during the phase of applying afterpressure.

FIG. 3 of the drawing shows how the piston 21 applies afterpressure to convey the material in the supply duct 12 to the mold cavity. The quantity of plastics material required can be adjusted in a sensitive manner by the movement of the piston 21.

Figure 4:
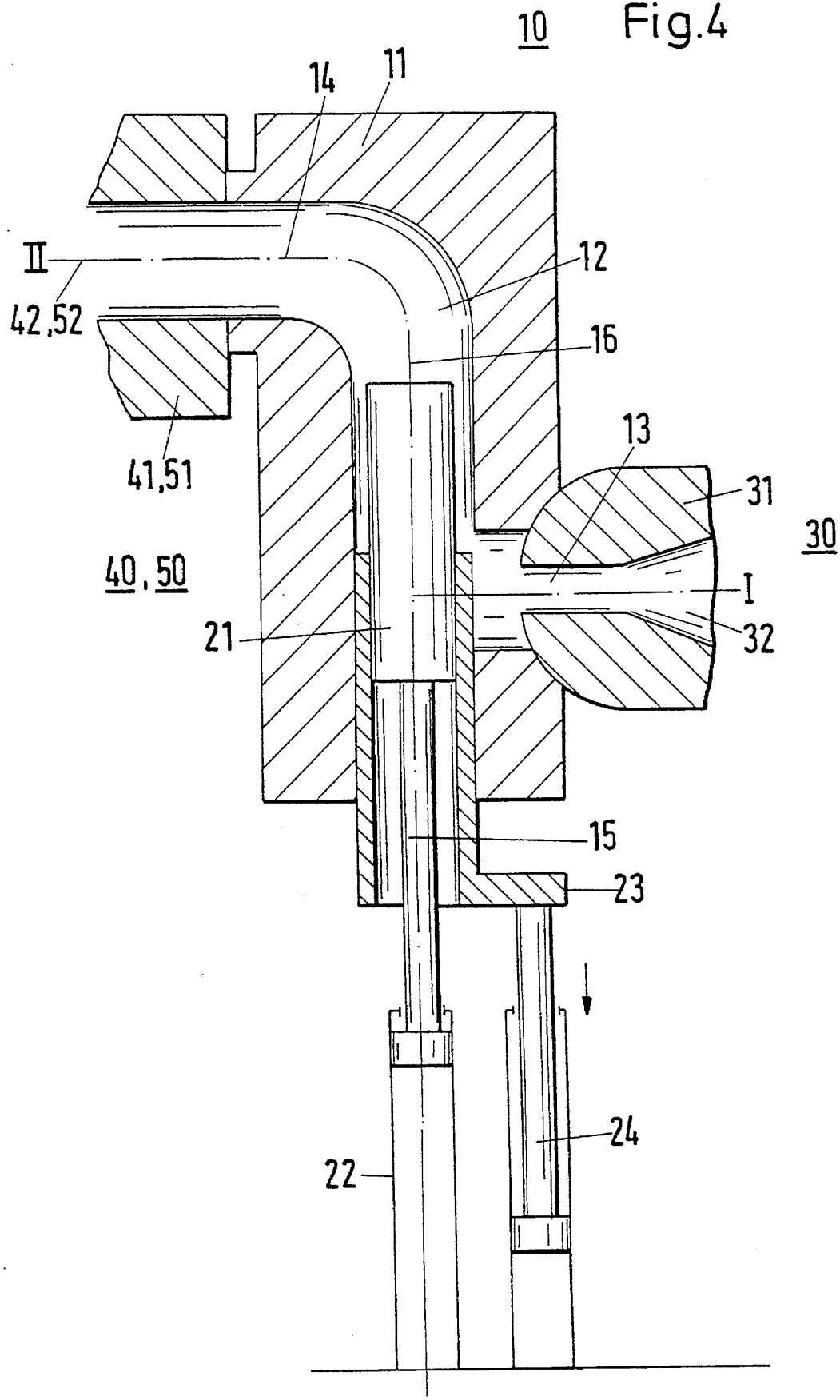
FIG. 4 shows the apparatus of FIG. 1 during the phase of opening the slide unit for completely releasing the supply duct for the next cycle.

FIG. 4 of the drawing shows how the previously interrupted material flow can be joined together again by carefully retracting the sleeve 23. The position of the piston 21 is maintained as the sleeve 23 is retracted. As soon as a continuous material flow is again present, the piston 21 can be retracted completely into that the initial position shown in FIG. 1 and the next injection cycle can begin.

The invention is not limited by the embodiments described above which are presented as examples only but can be modified in various ways within the scope of protection defined by the appended patent claims.

We claim:

1. A method for applying afterpressure on injection molding compounds in an injection molding machine including an injection mold having a mold cavity, and a screw connected to the injection mold through supply ducts, the method comprising the consecutive steps of:

conducting a heated injection molding compound in a material flow to the mold cavity by means of the screw in order to fill the injection mold;

after filling of the injection mold is concluded, cutting off the material flow in the vicinity of a screw opening and thereby permitting the material in the injection mold to cool and shrink;

during shrinkage of the material, compensating for a loss of volume of the injection molding compound due to shrinkage by additionally conveying a portion of the injection molding compound present in the supply ducts between the screw and the mold cavity;

after cooling of the injection molding compound has concluded, separating the continuous material flow of injection molding compound in the mold cavity from the material flow in the supply duct;

increasing an injection molding compound pressure in the supply duct to an injection molding compound pressure in the screw; and opening and releasing the material flow from the screw to the supply duct once the pressure in the supply duct equals the pressure in the screw and while maintaining the compound pressure in the supply duct in order to again form a continuous material flow without interrupting a strand formed by the injection molding compound in order to obtain an unimpaired injection procedure.

2. The method according to claim 1, further comprising thermally influencing the injection molding compound during the application of afterpressure.

3. A method for applying afterpressure on injection molding compounds in an injection molding machine including an injection mold having a mold cavity, and a screw connected to the injection mold by a supply duct, the method comprising the consecutive steps of: conducting a heated injection molding compound in a material flow to the mold cavity by means of the screw in order to fill the injection mold; after filling of the injection mold is concluded, cutting off the material flow by sliding a sleeve within the supply duct to block a screw opening, thereby permitting the material in the injection mold to cool and shrink; compensating for a loss of volume of the injection molding compound due to shrinkage by conveying a portion of the injection molding compound present in the supply duct toward the mold cavity by sliding a piston within the sleeve to push the molding compound; maintaining an injection molding compound pressure in the supply duct equal to an injection molding compound pressure in the screw by pressing the piston against the molding compound in the supply duct; opening and releasing the material flow by sliding the sleeve back away from the screw opening while maintaining the pressing of the piston against the molding compound already in the supply duct; and subsequently withdrawing the piston member away from the molding compound and out of the material flow, whereby a continuous material flow is again formed without interrupting a strand formed by the injection molding compound so as to obtain an unimpaired injection procedure.

* * * * *